United States Patent [19]

Cassonnet et al.

[11] 4,279,014

[45] Jul. 14, 1981

[54] ARRANGEMENT FOR CONVERTING VIRTUAL ADDRESSES INTO PHYSICAL ADDRESSES IN A DATA PROCESSING SYSTEM

[75] Inventors: Jean-Claude M. Cassonnet, Conflans Sainte Honorine; Guy Hiot; Violette Cohen, both of Paris, all of France

[73] Assignee: Compagnie Internationale pour l'Informatique CII-Honeywell Bull (Societe Anonyme), Paris, France

[21] Appl. No.: 933,546

[22] Filed: Aug. 14, 1978

[30] Foreign Application Priority Data

Aug. 17, 1977 [FR] France ............................... 77 25121

[51] Int. Cl.³ ............................................... G06F 9/20
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,394,350 | 7/1968 | Packard | 364/200 |
| 3,510,847 | 5/1970 | Carlson et al. | 364/200 |
| 3,778,776 | 12/1973 | Hakozaki | 364/200 |
| 3,902,163 | 8/1975 | Amdahl et al. | 364/200 |
| 3,970,999 | 7/1976 | Elward | 364/200 |
| 4,092,715 | 5/1978 | Scriver | 364/200 |

Primary Examiner—Joseph M. Thesz
Assistant Examiner—C. T. Bartz
Attorney, Agent, or Firm—Kerkam, Stowell, Kondracki & Clarke

[57] ABSTRACT

An arrangement for dynamically translating virtual address into absolute or physical addresses of items of data. Each virtual address includes a segment table number, a segment table entry, and a segment page number. Segment descriptors are stored in a central memory. The address of a particular segment descriptor may be calculated from the segment table number and the segment table entry. From the segment descriptor, a unique identification termed a logic page number may be calculated. The logic page number permits pseudo-associative access to a table containing a number of entries proportional to the number of physical pages of the main memory, allowing the physical address to be determined.

2 Claims, 7 Drawing Figures

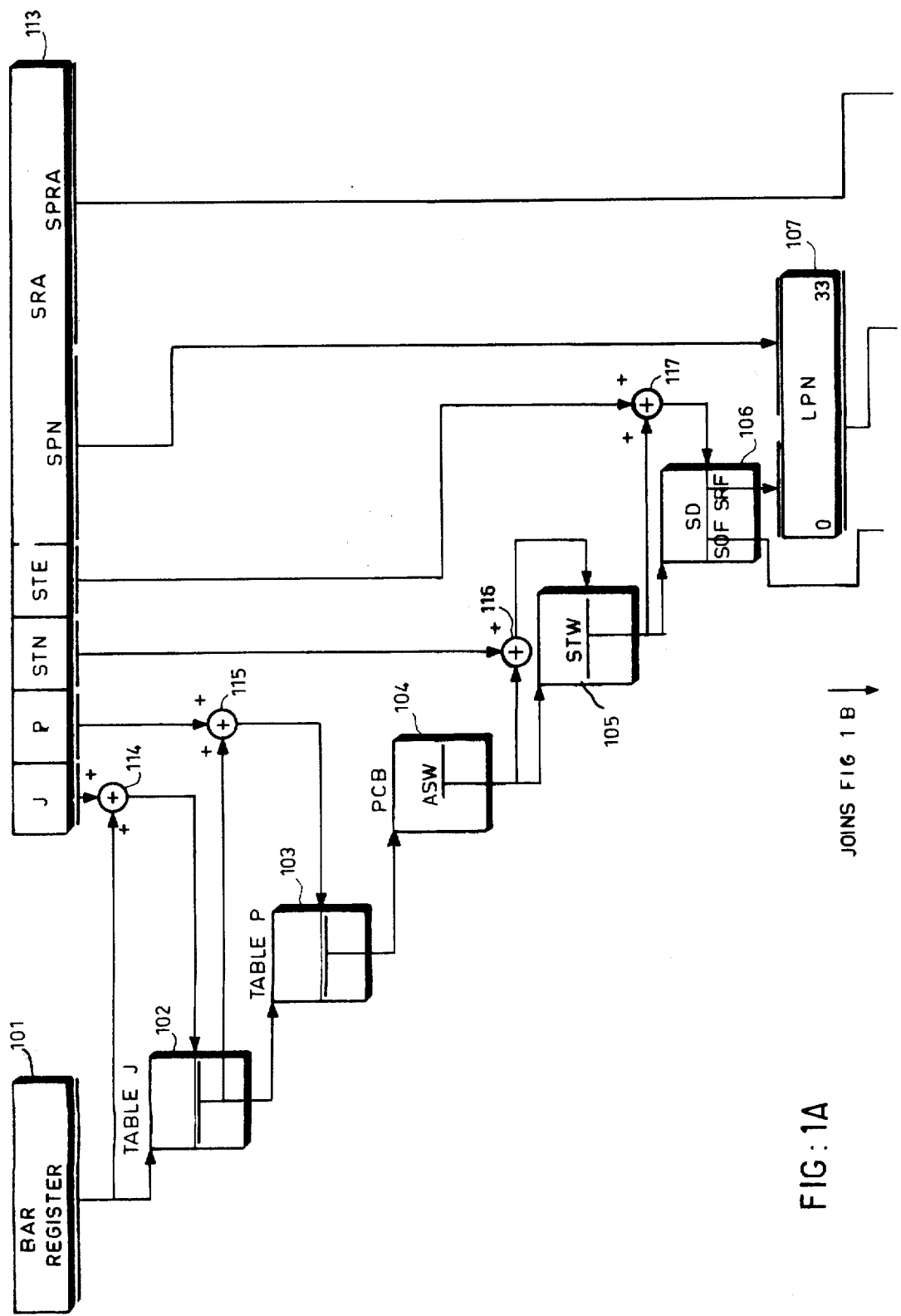

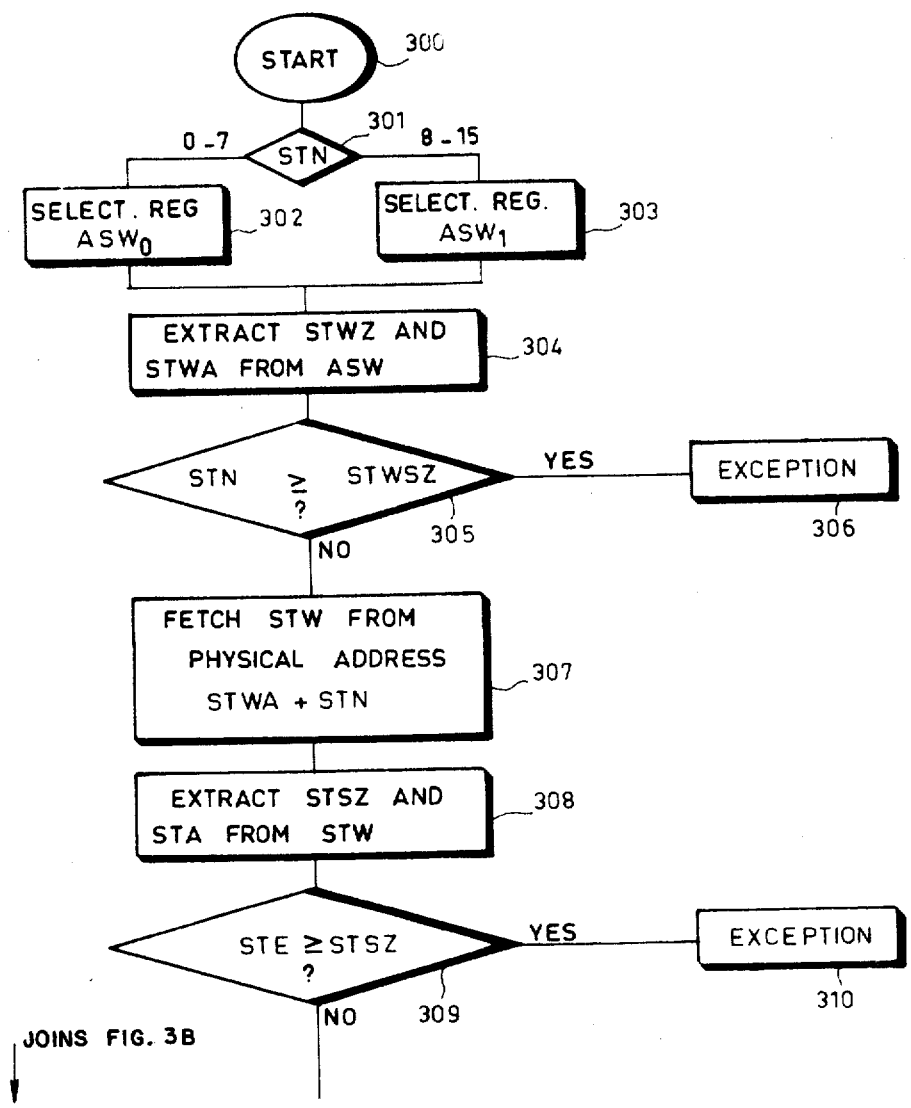
FIG: 3A

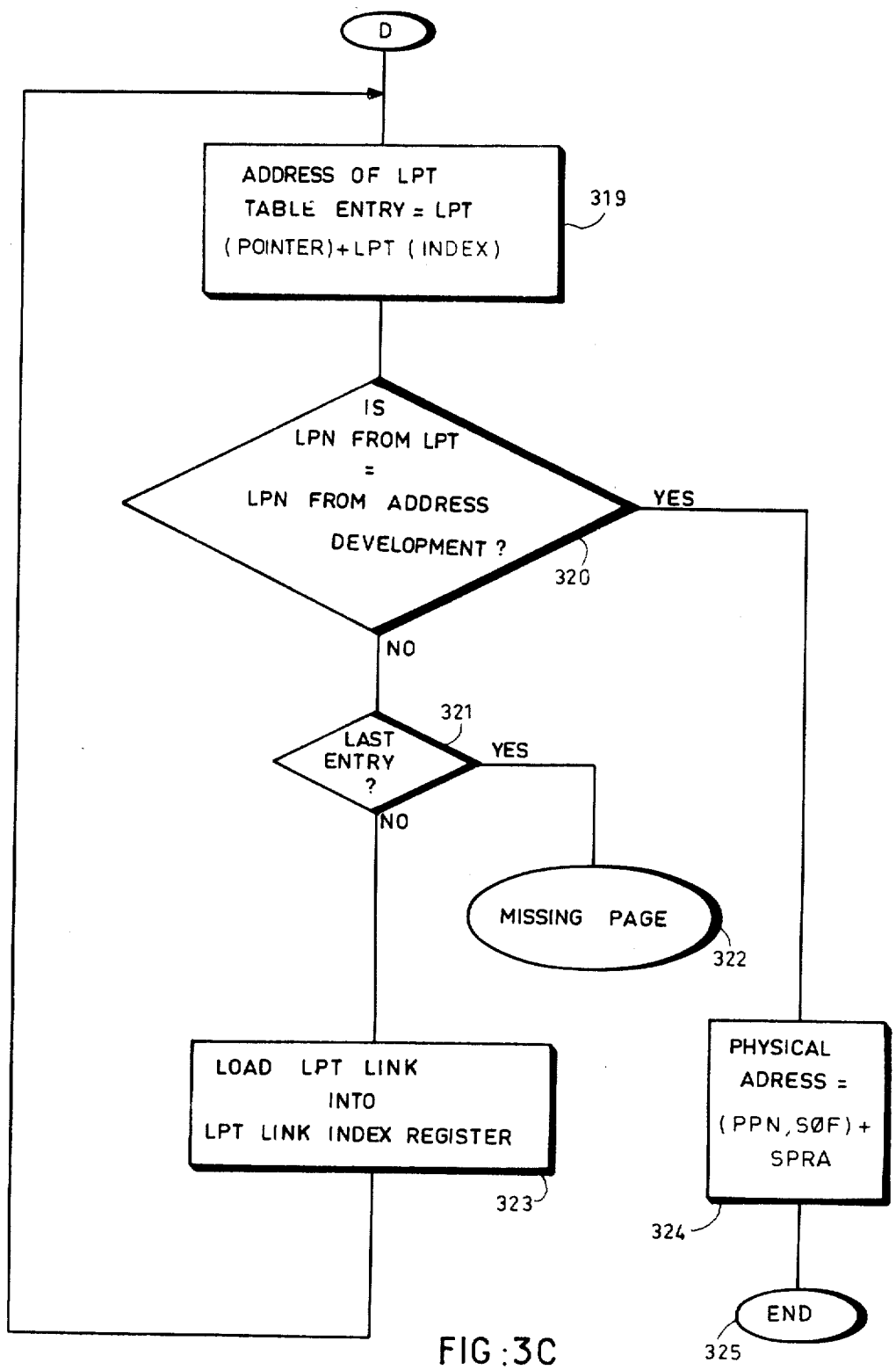
FIG: 3C

ARRANGEMENT FOR CONVERTING VIRTUAL ADDRESSES INTO PHYSICAL ADDRESSES IN A DATA PROCESSING SYSTEM

BACKGROUND OF THE INVENTION

The invention relates to memory systems which are employed in data processing units and particularly in data processing systems having a main memory, an auxiliary memory and an arrangement for dynamically translating virtual addresses into physical addresses by calculating a logic page number.

There are various known techniques by which a plurality of programs being executed by one or more data processing units may share a single memory. A memory which is shared in this way by programs needs to have a very large capacity, which is often greater than the capacity which can be provided at present. To deal with this situation, use is made of the concept of virtual memory. A virtual memory is divided into segments each of which can be divided into pages, each page containing a predetermined number of bytes. The addresses of the segments and pages in the virtual memory have random designations and occupy no particular positions in the main memory. The segments and pages of the virtual memory may thus be arranged in the main memory in a random fashion.

The random arrangement of the segments and pages in the main memory makes it necessary to translate or convert virtual addresses into physical addresses by using a set of conversion tables situated in the main memory.

In a system of unpaginated segmentation, the segments are of variable size and they are located by means of the base address (address of the first instruction of the segment) and the size (length) of the segment.

To access a segment with this method of location, it is necessary for the whole of the segment to be loaded into the main memory and this may be a drawback when only part of the segment is to be accessed. Space is then taken up in the memory of such systems to no purpose. Finally, the variable size of the segments considerably complicates the algorithm for finding locations available to receive a segment.

In a system using a virtual memory, conversion tables are used which are formed by segment tables and page tables. Each page table in a set of conversion tables gives actual locations of all the pages of a segment in the segment table.

This system has a number of disadvantages; the chief of which is that it causes the main memory to be occupied by a large number of page tables. The same disadvantages as are encountered with simple segmentation are once again encountered in connection with the algorithm for managing the space occupied by the page tables.

SUMMARY OF THE INVENTION

The invention has as an object to overcome these disadvantages by adopting the principle that access to a logic page in virtual space calls for the calculation of a logic page number LPN which is a unique identification, which is obtained from the segment descriptor, and which permits pseudo-associative access to a table containing a number of entries proportional to the number of physical pages of the main memory, thus allowing the desired absolute or physical address to be determined. This same logic page number LPN enables a referenced page to be represented unambiguously by a plurality of segment descriptors whether the page is in the main memory or an auxiliary memory.

In accordance with another feature of the invention, the addressing space of the system is broken down in pages of fixed size. A page has a single, clearly defined system name which is the logic page number LPN. On the basis of this name, it is possible to locate the page in the various memory levels of the system either in an auxiliary memory or in the main physical memory. When the page is present in the physical memory, its location will be defined by a physical page number PPN.

BRIEF DESCRIPTION OF THE DRAWINGS

The invention will be better understood from the following detailed description, which is given with reference to the drawings, in which:

FIGS. 1A and 1B illustrate the pagination principle employed in the address generation according to the invention;

FIGS. 3A, 3B, and 3C show the operation of the arrangement shown in FIGS. 2A and 2B in the form of flow-charts.

DETAILED DESCRIPTION OF THE INVENTION

Figure 1B:
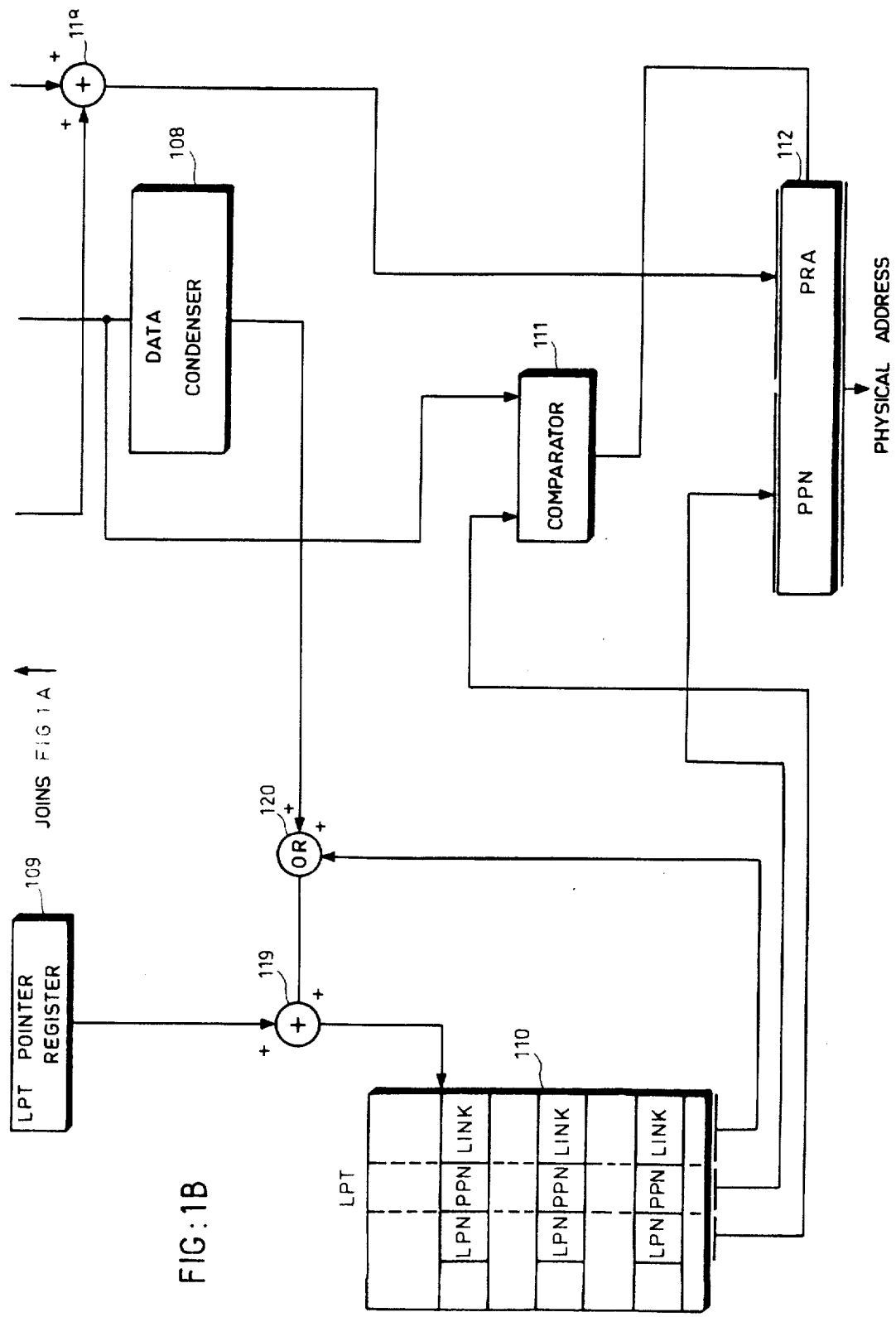

The format of an effective address word representing the location of an item of data is shown at 113 in FIG. 1A. The format comprises a zone J and a zone P which indicate the name of the process to which the item of data belongs, a zone STN which designates a segment table number, a zone STE which designates a segment table entry, and a zone SRA which designates the relative address of the item of data in the segment. To apply the principle of pagination according to the invention, the relative address SRA is subdivided into zones which are:

(1) A zone SPN which indicates the number of the page in the segment to which the item of data belongs, and (2) A zone SPRA which designates the address of the item of data in the page defined by SPN, it being understood that there may be a plurality of pages of equal length in a segment or a plurality of segments in a page.

The address generation according to the invention relies on reading a plurality of items of information from the main memory. There is in the central unit a BAR register 101 which contains the address of a table J 102 in the main memory in which are set out all the jobs to be performed in the case of a specific group of jobs. The number J found in the effective address 113, when added at 114 to the address of the table J contained in BAR register 101, enables the address of the table P which contains all the instructions required to execute the job J currently being executed to be read from table J 102. The address of the table P, when added at 115 to the number P present in the effective address 113, allows the address to be read of a process control block PCB 104 in which is stored the address ASW of the segment table used to carry out the process. This address, when added at 116 to the number STN contained in the effective address 113, allows the address STW of a segment table 105 to be read, in which table is situated a list of all the segment descriptors SD's associated with the STN which are used to run the process. This address, when added at 117 to the number STE contained in the effective address word 113, enables the content of a segment descriptor SD to be read. For a two-zone paginated segment, the segment descriptor SD comprises a zone SOF indicating the start address of the segment in the page and a zone SRF which forms a unique reference for the segment.

The content of zone SOF is added at 118 to the relative address in the page, which is taken from zone SPRA of the address word 113, to form the word PRA at the physical address 112 in the page. The content of zone SRF is concatenated at 107 with zone SPN of the effective address 113 to form the logic page number LPN.

This number LPN is then condensed in an operator 108 to be used to address the logic page table LPT 110. The table LPT contains all the logic page numbers LPN for the whole system, the corresponding physical page numbers PPN, and the links (LINK) which enable logic pages to be chained together. The address of a logic page number in an LPT table is obtained by adding to the content of a table pointer 109, an index which is formed either, at the first access, by the number LPN which is condensed via operator 108, or, when further access is necessary, by the content of the LINK zone found at the address of the previous LPN. This operation is performed by operators 119 and 120.

The number LPN read from the logic page table LPT 110 is compared in a comparator 111 with the number LPN 107, for verification, to allow the operation of concatenating the number PPN read from table LPT with the address PRA to take place so as to form the physical address 112.

Figure 2A:
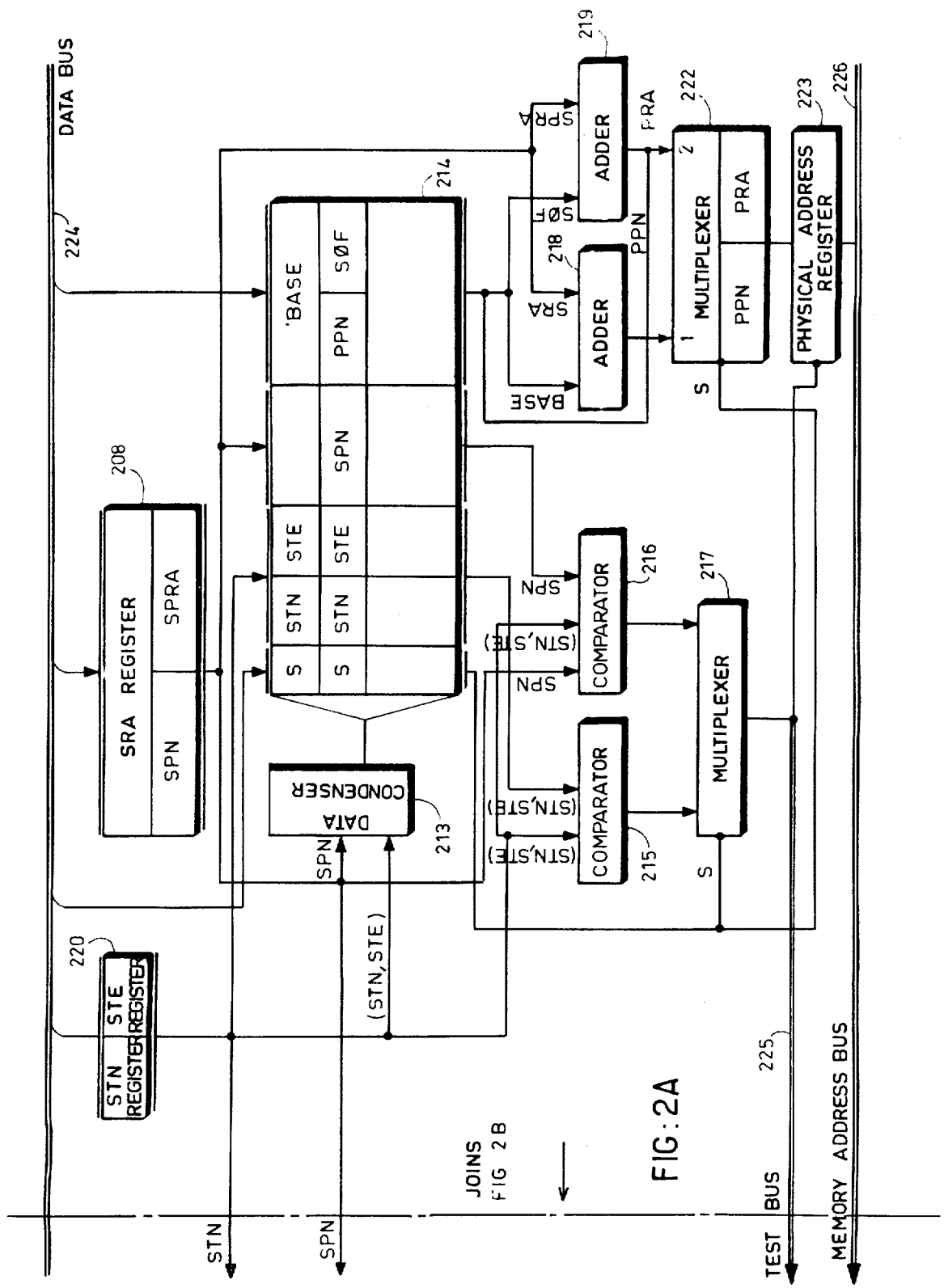
FIGS. 2A and 2B show the hardware which enables the address conversion according to the invention to be put into effect.
Figure 2B:
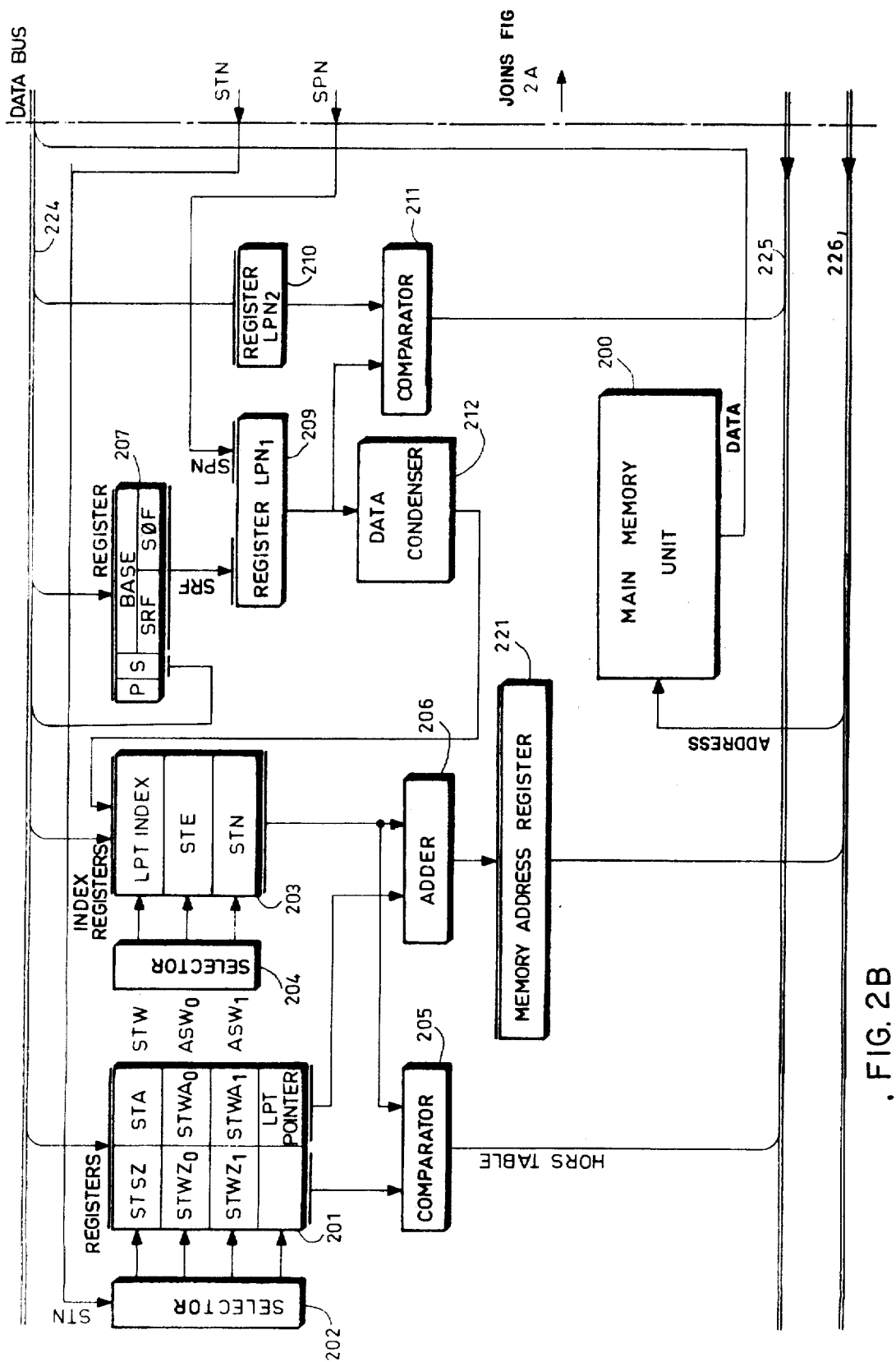

FIGS. 2A and 2B show the arrangement which enables the address conversion according to the invention to be performed. Specifically, FIG. 2A shows the use of a pre-memory according to the invention, and FIG. 2B the arrangement for reloading the pre-memory.

The arrangement in question makes it possible to handle the generation of addresses for data belonging both to segments which are organized in pages and to segments which are not so organized. In the case of organization in pages, the virtual address consists, as seen above, of the parameters STN, STE, SPN and SPRA. In cases where there is no organization into pages, the virtual address consists of parameters STN, STE, and SRA.

The arrangement according to the invention enables both these kinds of parameter to be handled.

The arrangement can be connected directly to the data bus 224 which connects together all the units making up the central unit of a data processing system. Such units are known in the prior art and need not be described in detail here. Only the main memory unit 200 and the arrangement which is the subject of the invention are shown.

The latter consists, as regards the section for making use of the pre-memory (FIG. 2A), of registers STN, STE 220 register SRA 208, a data condenser 213, a pre-memory 214, comparators 215 and 216, a multiplexer 217, adders 218 and 219, a multiplexer 222, and a register 223. As regards the section for reloading the pre-memory (FIG. 2B), it consists of a set 201 of registers for identifying tables in the main memory unit 200, a set of index registers 203, an adder 206, a comparator 205, registers 207 and 209, 210 and 221, a comparator 211, and a data condenser 212. All these registers and operators are connected to the data bus 224, to a test bus 225 and to a memory address bus 226.

In FIG. 2A, register 220 is used to hold the segment identifying numbers STN and STE. Register 208 is used to hold the relative address SRA of an item of data in a segment, which, in the case of the paginated segment, breaks down into a page number SPN in the segment and the relative address SPRA of the item of data within the page.

The contents of registers STN, STE 220 and field SPN of register 208 are transmitted via a data condenser 213, which is produced in conventional fashion by means of exclusive-OR circuits, to the input of the address selector of the pre-memory 214 and so to the pre-memory. It will be recalled that a pre-memory is a buffer memory which is loaded in advance by means of a microprogram whose alogrithm is based on the consideration that there is a high probability that information which the central unit will be looking for in the near future is held in the central memory near the information which has just been addressed.

The pre-memory 214 contains the information required to calculate the physical address of an item of data, thus avoiding, when reaccessing an item of data, the need to re-calculate the address of the item of data in its segment or in its page if this calculation has already been performed.

The word at any address in the pre-memory 214 contains a first state zone S which defines whether the data word is in an unpagenated or a pagenated segment, the method of calculating the physical address depending upon whether the segment concerned is unpagenated or pagenated. The word has a second zone identifying the segment or page. If the segment contains no pages, the identifier will consist only of the numbers STN and STE, while if the segment is divided into pages the identifier will then contain in addition the number SPN. The word at any address of the pre-memory 214 also has a third zone which defines an actual address and which comprises either the base address of the segment if the segment is not divided into pages, or the physical page number PPN corresponding to the page defined by STN, STE and SPN and the offset of the segment within a page (SOF).

For pseudo-associative access, these zones are addressed from fields STN, STE and SPN (if there is one), and their content is compared in comparators 215 and 216. Depending upon the state (S) of the zone addressed, the result of the comparison is taken via the multiplexer 217, either from the output of comparator 215.

Adder 218 adds the BASE of a segment found in the pre-memory to the relative address SRA of the item of data, which is found in register 208. If the item of data belongs to an unpaginated segment the result then represents the physical address of the item of data. Adder 219 adds the content of the zone SOF found in the pre-memory to the content SPRA of register 208 to form the address PRA of the item of data in the page.

The multiplexer 222 is also controlled by the state field S from the pre-memory 214 and receives at its input 1 the output of adder 218, which represents a physical address in the case of a non-paginated segment, and at its input 2 a combination of the field PPN from the pre-memory 214 and the output of adder 219 which represents the relative address PRA in the page.

Register 223 contains the result of the address conversion. It is loaded by the output of the multiplexer 222 is equality is found in whichever of the comparators 215 or 216 is selected. Either comparator 215 or 216 is selected by multiplexer 217 as a function of the state field S in the pre-memory 214.

In FIG. 2B the set of registers 201 is used to identify tables in the main memory unit 200. These registers are loaded from the data bus 224 and are addressed by a selector 202. In FIG. 2B the registers are four in number. A first register STW is intended to contain the address word for the segment tables. Register STW is divided into a zone STSZ intended to contain the size of the table and a zone STA intended to contain the address word of the table in actual memory. A second register $ASW_0$ is divided into two zones $STWZ_0$ and $STWA_0$. Zone $STWZ_0$ contains the address word which enables a segment table to be addressed in physical memory. A third register $ASW_1$ is divided into two zones $STWZ_1$ and $STWA_1$. The function of this latter register is the same as that of register $ASW_0$ except that register $ASW_0$ has assigned to it the segment table numbers STN from 0 to 7 while register $ASW_1$ has assigned to it the segment table numbers STN from 8 to 15. A fourth register, LPT pointer, contains the address word of a page table in the main memory unit 200.

The set of index registers 203 contains the indexes required to address data within the tables which are addressed by the set of registers 201. It contains a first LPT INDEX register which is used at the time of access to a logic page table, a second register STE which gives the address of an entry within a segment table, and a register STN which gives the address of a word within a segment table. A selector 204 is used to address the above three index registers. These registers are loaded directly from the data bus 224.

The comparator 205 compares the first zone STSZ, $STWZ_0$ or $STWZ_1$ in each of the registers 201 with the content of each of the index registers 203. Thus, word STN may be compared with one of the words STWZ and word STE may be compared with word STSZ.

The adder 206 is used to calculate an address in the main memory unit 200 by adding the content of a word STA, STWA or LPT to an index word from the set of registers 203. The result of the calculation is loaded into register 221 and then transmitted along the memory address bus 226.

Register 207 is used to store a segment descriptor SD and it comprises a first zone which may contain either the word designating the BASE of a segment or the words SRF and SOF, and a second zone which contains the state S of the descriptor and a presence bit P.

Register 209 contains the generated logic page number $LPN_1$ and is used to concatenate the word SRF for a segment descriptor contained in register 207 with the word SPN found in register 208 (FIG. 2A). The result of the concatenation is transmitted to a first input of comparator 211, the second input of comparator 211 being connected to the output of register 210 whose content represents the addressed logic page number $LPN_2$ which is read from a logic page table LPT situated in the main memory unit 200. The result of the comparison is transmitted along test bus 225. The result of the concatenation in register 209 is also transmitted, via a data condenser 212, which is produced in the conventional fashion from exclusive-OR circuits, to LPT index register 203.

Figure 3B:
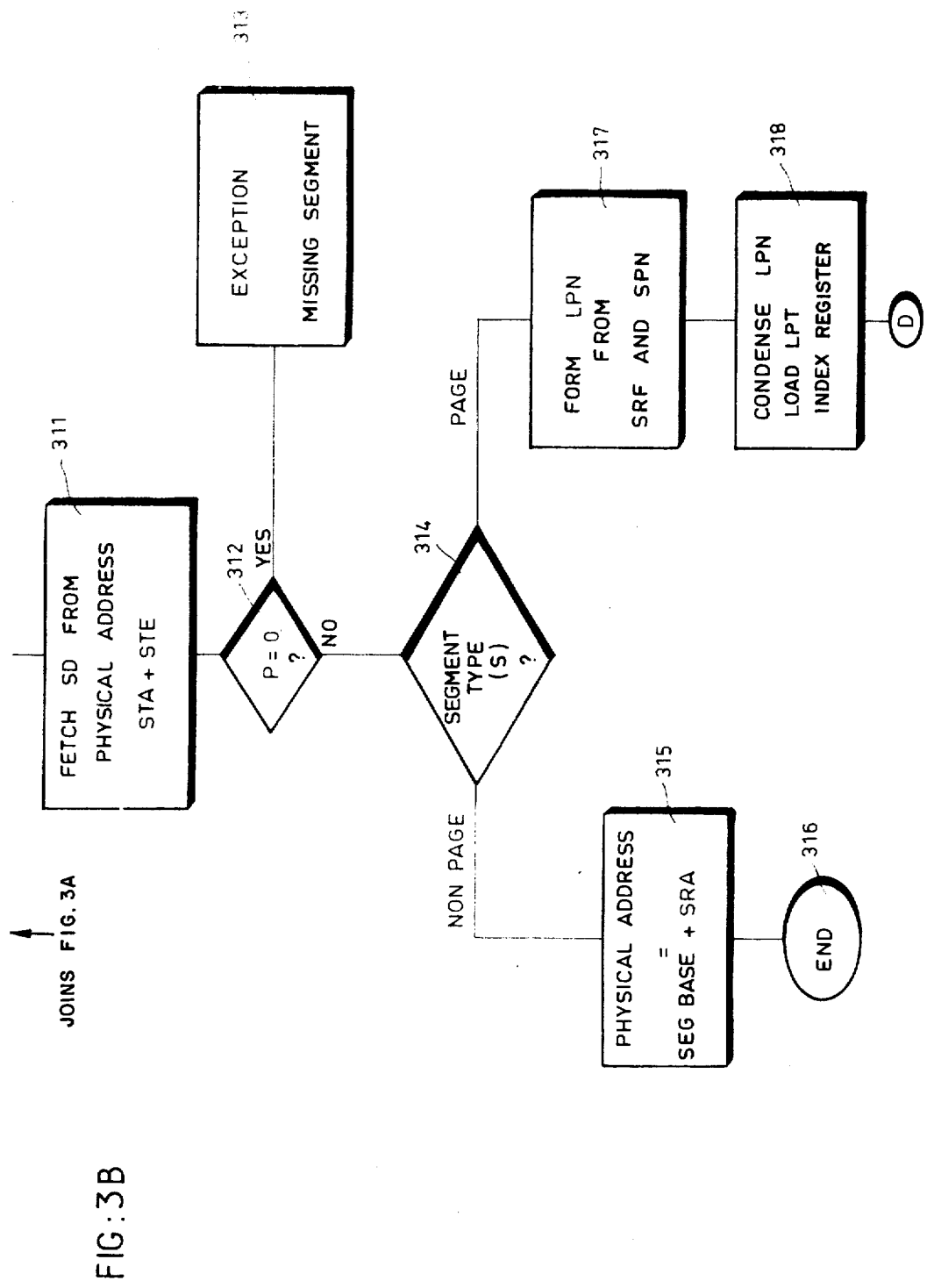

The operation of the arrangement will be described with reference to FIGS. 3A, 3B and 3C. These FIGS. deal with operation during the whole of the address conversion.

It will be assumed that in the initial state of operation, registers 203, STW, $ASW_0$ and $ASW_1$ have been loaded to suit the process (JP) currently being run by the data-processing system, that registers 220 (STN, STE) and 208 (SRA) contain the parameters for the virtual address, and that words $ASW_0$ and $ASW_1$ have been accessed and loaded into registers 201.

Beginning from the initial state, represented by step 300 in FIG. 3A, the process of calculating the address is as follows. In steps 301, 302 and 303, register $ASW_0$ or $ASW_1$ is selected by the selector 202 as a function of the value of STN.

In step 304, STWA and STWZ are extracted from the register ASW. Then, in step 305, to ensure that the segment table number STN is not greater than the segment table word size STWZ, the value of word STN is compared to word $STWZ_0$ or $STWZ_1$ in comparator 205. If STN is greater than or equal to STWZ, an exception (step 306) is generated.

If STN is less than STWZ, in step 307, the address word for a segment table in the main memory unit 200 is formed. Specifically, the pointer STWA is added to the content of word STN is added 206. This address is transmitted to the main memory unit 200 to load the word STW into the register bank 201 via the data bus 224.

In step 308, STSZ and STA are extracted from the register STW. Then, in step 309, the value of word STE is compared to word STSZ in comparator 205. If STE is greater than or equal to STSZ, an exception (step 310) is generated.

If STE is less than STSZ, the address of a segment descriptor SD is formed in step 311. Specifically, register STW is selected and pointer STA is added to the content of word STE in adder 206. This address is transmitted to the main memory unit 200 to fetch the segment descriptor, which is then loaded into register 207.

From FIG. 1A, it will be recalled that the segment descriptor SD comprises the zone SOF indicating the start address of the segment, and the zone SRF which forms a unique reference for the segment.

To ensure that the segment is present, in step 312 the presence bit P in the register is examined, and an exception (step 313) is generated if the presence bit P is zero.

In step 314, zone S (segment type) of the segment descriptor is examined. The pre-memory 214 is addressed by the content of registers STN, STE 220 and field SPN of register 208 via the data condenser 213. In the case of an unpaginated segment, in step 315 pre-memory 214 is loaded by the fields STN, STE from register 220 and by the BASE and S fields from register 207 via the data bus 224. The segment base address SEG BASE found in pre-memory 214 is then added to the relative address SRA contained in register 208 by adder 218. The result is then loaded into the physical address register 223.

In the case of a paginated segment, in step 317 the register $LPN_1$ 209 is loaded with the field SRF found in register 207 and the field SPN found in register 208. In step 318, the data contained in register $LPN_1$ 209 is condensed by condenser 212 and loaded into the LPT index register of the bank of index registers 203.

In step 319, the content of the LPT POINTER register in register bank 201 is selected and added to the content of the LPT INDEX register of register bank 203 to form the physical address of an entry in an LPT table. This address is transmitted to main memory unit 200 along the memory address bus 226.

The content of table LPT, at the selected entry, is fed onto the data bus 224. The state zone is analyzed to generate, if required, a missing page exception and to stop the address translation process. The field LPN found in table LPT is then fed into register $LPN_2$ 210 and the LPN number linking field LINK found in the table LPT is loaded into the LPT index register of register bank 203.

In step 320, the number $LPN_2$ contained in register 210 (from the Logic Page Table) is compared in comparator 211 with the number $LPN_1$ contained in register 209 (from the address development). If they are found to be equal, the pre-memory 214 is loaded with fields STN, STE, SPN form registers 220 and 208, fields SOF and S from register 207, via data bus 224, and field PPN from table LPT via data bus 224.

In step 324, the field SOF from pre-memory 214 is added in adder 219 to the field SPRA from register 208. The result PRA is concatenated with the field PPN from the pre-memory 214 to form the physical address, which is loaded into the physical address register 223.

If in step 320 the LPN numbers are not found to be equal, and if in step 321 the entry selected in the LPT is not the last in the line, the execution of the address translation process goes on to step 323 and then returns to step 319. Thus, the pre-memory 214 makes it possible to avoid going through the other stages at the time of every address conversion when the identifier from the virtual address presented at 220 and 208 is recognized to be present. If on the other hand in step 321, the selected table entry is the last in line, a missing page exception (step 322) is generated and the address conversion process stops.

The preferred embodiment of the arrangement of the invention which has just been described is in no way limiting. It is clear that the man skilled in the art of data-processing techniques could arrive at other embodiments without thereby exceeding the scope of the invention.

What is claimed is:

1. In a data processing system of the type having a virtual memory including a main physical memory and an auxiliary memory, space in said main physical memory being allocated on the principle of segmentation wherein said main memory is divided into a plurality of logical groupings termed segments, each segment occupying contiguous main memory space and being treated as a unit, addressing and other characterizing information for each segment being defined by a respective segment descriptor stored in said main physical memory, and the segment descriptors being grouped into segment tables in said main physical memory, each segment descriptor thus being a segment table entry;

an arrangement for translating a virtual address of an item of data into a physical address, the virtual address being expressed as an effective address word including zones (STN and STE) for designating a particular segment table out of the group of segment tables and a particular segment table entry in the particular segment table, the segment table entry being a segment descriptor, and a segment relative address zone (SRA) which is divided into a segment page number zone (SPN) for indicating the number of the page in the segment to which the item of data belongs and a zone (SPRA) which designates the address of the item of data in the page defined by the segment page number (SPN), said arrangement comprising:

each of the plurality of segment descriptors stored in said main physical memory as segment table entries including an area (SRF) which contains a unique reference for the segment;

means for addressing a segment descriptor in said main physical memory based on the contents of the zones (STN and STE) in the effective address word designating a particular segment table and entry;

means for generating a logic page number (LPN), which means operate to concatenate the unique reference for the segment (SRF) which is contained in the addressed segment descriptor to the segment page number (SPN) which is contained in the effective address word;

a logic page table (LPT) stored in said main physical memory, said logic page table containing at each address two entries, one entry being a logic page number entry and the other entry being a corresponding physical page number entry;

means indicating the starting address of said logic page table;

means for adding the generated logic page number to the indicated starting address of said logic page table to create an LPT address, which when applied to the logic page table (LPT) locates a logic page number entry and a physical page number entry for each said LPT address;

means for comparing the generated logic page number to the logic page number entry to indicate a match; and means for generating the physical address of the item of data in main physical memory by concatenating the physical page number entry and the zone (SPRA) which designates the address of the item of data in the page defined by the segment page number, said means for generating the physical address being activated when a match occurs between the generated logic page number and the logic page number entry.

2. An arrangement according to claim 1, wherein said means for adding the generated logic page number to the indicated starting address of said logic page table includes means enabling logic page numbers to be linked one to another within said logic page table.

* * * * *

UNITED STATES PATENT AND TRADEMARK OFFICE
CERTIFICATE OF CORRECTION

PATENT NO. : 4,279,014
DATED : July 14, 1981
INVENTOR(S) : Jean-Claude M. Cassonnet et al.

It is certified that error appears in the above-identified patent and that said Letters Patent are hereby corrected as shown below:

Claim 1, Column 8, Line 18, after "area" insert --of information--.

Signed and Sealed this

Tenth Day of November 1981

[SEAL]

Attest:

GERALD J. MOSSINGHOFF

Attesting Officer

Commissioner of Patents and Trademarks